INVENTORS
C. S. MORRISON &
B. M. SILVERBERG

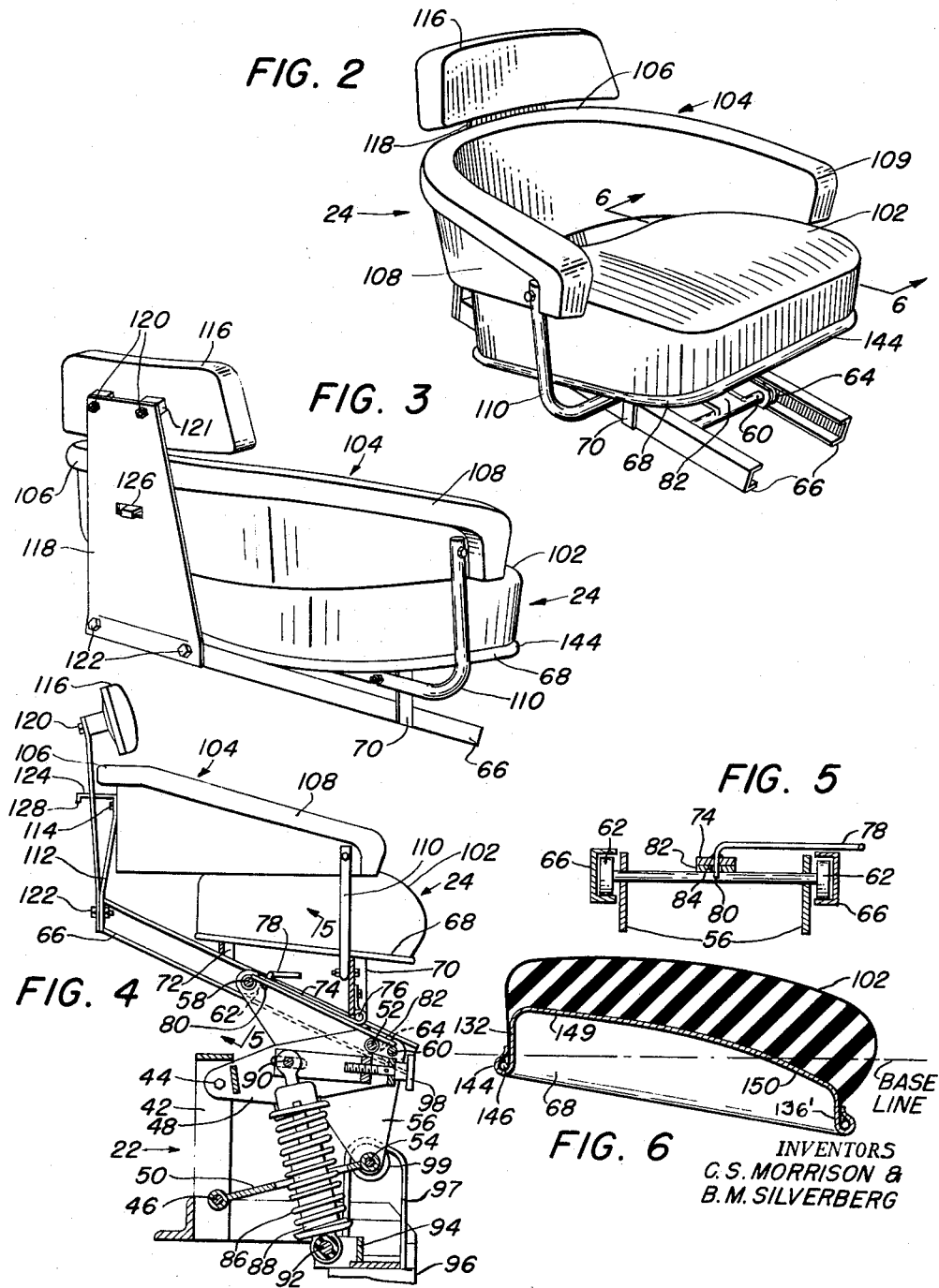

April 12, 1960   C. S. MORRISON ET AL   2,932,341
VEHICLE SEAT
Filed July 12, 1954   3 Sheets-Sheet 3
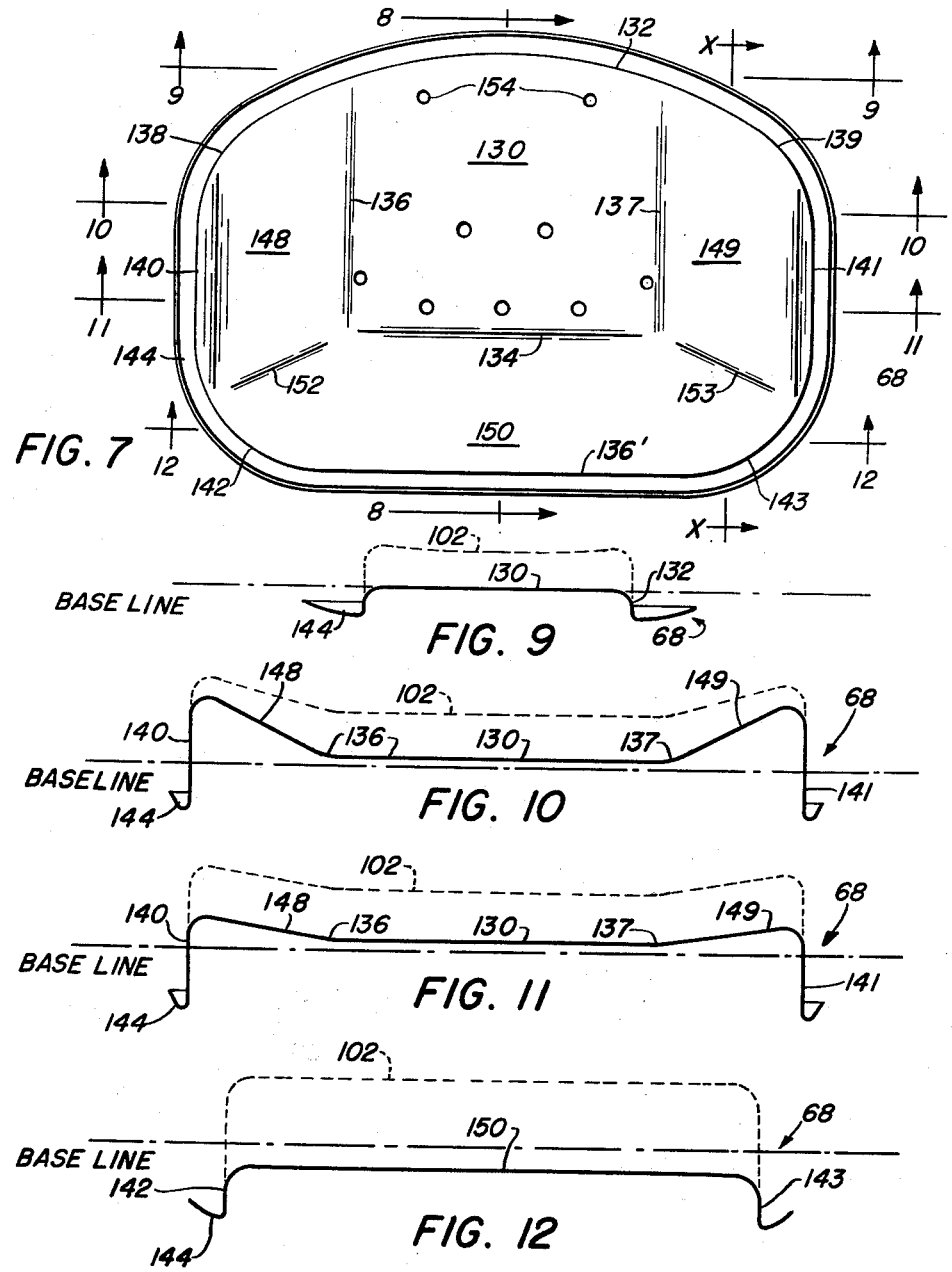
INVENTORS
C.S. MORRISON &
B.M. SILVERBERG

United States Patent Office 2,932,341
Patented Apr. 12, 1960

2,932,341

VEHICLE SEAT

Charles S. Morrison, Moline, and Bernard M. Silverberg, Rock Island, Ill., assignors, by mesne assignments, to Deere & Company, a corporation of Delaware Application July 12, 1954, Serial No. 442,756

10 Claims. (Cl. 155—9)

This invention relates to a seat and more particularly to a seat for an agricultural vehicle such as a tractor.

Although seat designers have in the past been quite prolific in their efforts to design a variety of seats for the home, the passenger automobile and public institutions, they seem to have conscientiously or otherwise ignored the seating problem in the field of agricultural vehicles. The experiences gained in general seat design have afforded the designer little if any benefit in the agricultural vehicle seat field, because the problems are wholly different. Even the seating problems of the passenger automobile or heavy-duty vehicles, such as trucks, busses, etc. lend little that can be appropriated, primarily because such vehicles operate almost without exception over smooth roads and highways and, compared with the operation of an agricultural vehicle, there is little pitching, jouncing and departure from a lateral mean. Moreover, the variations from a normal ride are more extreme and sometimes even violent in the operation of a tractor, for example, over a plowed field on rolling terrain which may be interrupted from time to time by ridges or ditches transverse to the line of travel.

The recent trend in the agricultural field is a departure from the old theory of giving the operator merely something to sit on, supplemented only by the hope that he will have the presence of mind to hang on tight when the going gets rough and will know enough to rest when he becomes tired. However, experience has shown and statistics prove that tractor seats of prior design are so inefficient and in fact designed contrary to basic medical principles as to literally subject the operator to a form of torture, resulting in quick fatigue, deterioration of the body organs and physical hazards involving serious consequences. Fatigue has been proven to retard muscular reaction and thereby results in a safety hazard.

Although tractor seat designers have in the more recent past devoted some consideration to the proper suspension of a tractor seat and have thus improved the lot of the rider, improved suspension alone is not the complete answer. The absence of sprung wheels in a tractor presents a problem that requires compensation for that absence in the design of the seat and seat suspension. Moreover, the shape of the seating surface and the relationship of the rider to the various controls have now been determined to be significant factors in minimizing or eliminating fatigue. Also of importance is the manner in which the rider's body is supported not only vertically but laterally and fore and aft.

Accordingly, one of the primary objects of the present invention is to provide an improved seat structure including a novel seating surface having a rear, central rider-supporting portion which extends forwardly and merges with a downwardly and forwardly sloping frontal portion. In addition, the central portion merges in opposite lateral directions with upwardly and laterally outwardly inclined side portions.

The central and substantially level portion of the seating surface provides support for the ischial tuberosities which are the lowermost projections of the pelvis. The body weight is not distributed over the entire buttocks as in the bucket or body-contoured seat. Medical science has determined that it is physiologically unsound to require the great trochanters and surrounding flesh to support a major portion of the body weight. To insure that the ischial tuberosities provide the body support, the central approximately level portion of the subject seat is considerably wider than the average 4¼ inch spacing between tuberosities of the adult pelvis. Thus the average rider has freedom to shift his position sidewise and the largest rider is seated with comfort. The frontal portion of the seat surface slopes away so as to relieve undesirable pressures on the main nerve trunks and blood vessels which are located on the underside of the lower thigh. Prolonged supporting pressure on this area results in muscular fatigue and muscle cramps.

When the vehicle operates on a slope that is transverse to the line of advance, the associated lateral or side portion that slopes upwardly and outwardly from the central portion becomes a rider-supporting portion and thus maintains the level or almost level position of the rider, the slope of the portion just referred to having been calculated to prevent wedging the thigh against the safety side rest on the basis of transverse slopes encountered with greatest frequency, such as in plowing. Another feature of the invention is a combined arm and pelvic area back support in the form of a U-shaped element that embraces the seat from the rear and provides in effect an arcuate wall around the rear and side portions of the seat. This U-shaped element is rigid and in addition thereto the seat has an upper portion for yieldably supporting the lumbar back area of the rider. Since the embracing portion is rigid, it adequately confines the rider against undesirable lateral and rearward shifting on the seat. At the same time, the upper or lumbar back rest enables him to lean backwardly for relaxation when operating the vehicle over relatively smooth terrain. Stop means prevents undue yielding of the upper back rest and thus the danger of an accident by falling rearwardly off the seat is avoided. The lumbar back rest is so positioned and yieldably mounted as to prevent accidental injurious contact with the lumbar region while sitting erect as when operating the vehicle over rough terrain.

Combined with the features of the seat surface as such is the arrangement of the seat in such manner that it can be adjusted rearwardly and upwardly. This arrangement, in association with a novel foot rest structure, adequately accommodates the seating arrangement to riders of all sizes. The sloping foot rest provides an angle of approximately 90° at the ankle joint while the included knee angle is approximately 135° which provides for efficient bracing of the pelvis against the U-shaped element. The knee angle must not be less than approximately 90° when the feet are positioned on the level portion of the platform. The thighs are sloped slightly downward to enable the operator to lean forward without encountering the discomfort and fatigue which would result from an acute angle at the hip joint. For example, an extremely tall rider having relatively long legs will require a seat that is not only farther rearwardly from the steering wheel but also higher above the platform. The short rider will require a seat that is both lower and closer to the steering wheel. The angle of the foot rest is related to the angle at which the frontal portion of the seat slopes and, even though the tall operator is more distant from the steering wheel, the arrangement is such that he has utmost comfort in a static position. The suspension of the seat is depended upon afford the necessary flexibility in opposite vertical directions and will normally include a yieldable support in combination with some form of shock absorbing means, the details of which are not important here except as an adjunct to the over-all comfortability characteristics of the seat.

It is another object of the invention to achieve the characteristics of the various shapes of the seating surface by means of a preformed seat pan on which the yieldable seat cushion is mounted, the ultimate surface of the seat cushion generally conforming to the configuration of the pan so that the surfaces created by the pan are carried out into the surface of the seat. Additionally, the cushioning material—preferably a well known type of foam rubber—may be varied in height according to the calculated points of greatest pressure.

The foregoing and other important objects and desirable features of the invention are attained in a preferred embodiment thereof as described in the following specification and as illustrated in the accompanying sheets of drawings, the several figures of which will be described immediately below.

Fig. 2 is another perspective of the seat by itself as seen from the front and one side.

Fig. 3 is another perspective of the seat shown in Figs. 1 and 2, as seen from the rear and one side.

Fig. 4 is an elevation, partly in section, showing the seat and one form of suspension means therefor.

Fig. 5 is a transverse section on an enlarged scale as seen along the line 5—5 of Fig. 4.

Fig. 6 is a section, on an enlarged scale, as seen in a fore-and-aft plane including the line 6—6 of Fig. 2.

Fig. 7 is an enlarged plan of the seat pan per se.

Figs. 9, 10, 11 and 12 are sections respectively on the lines 9—9, 10—10, 11—11 and 12—12 of Fig. 7.

Figure 1:
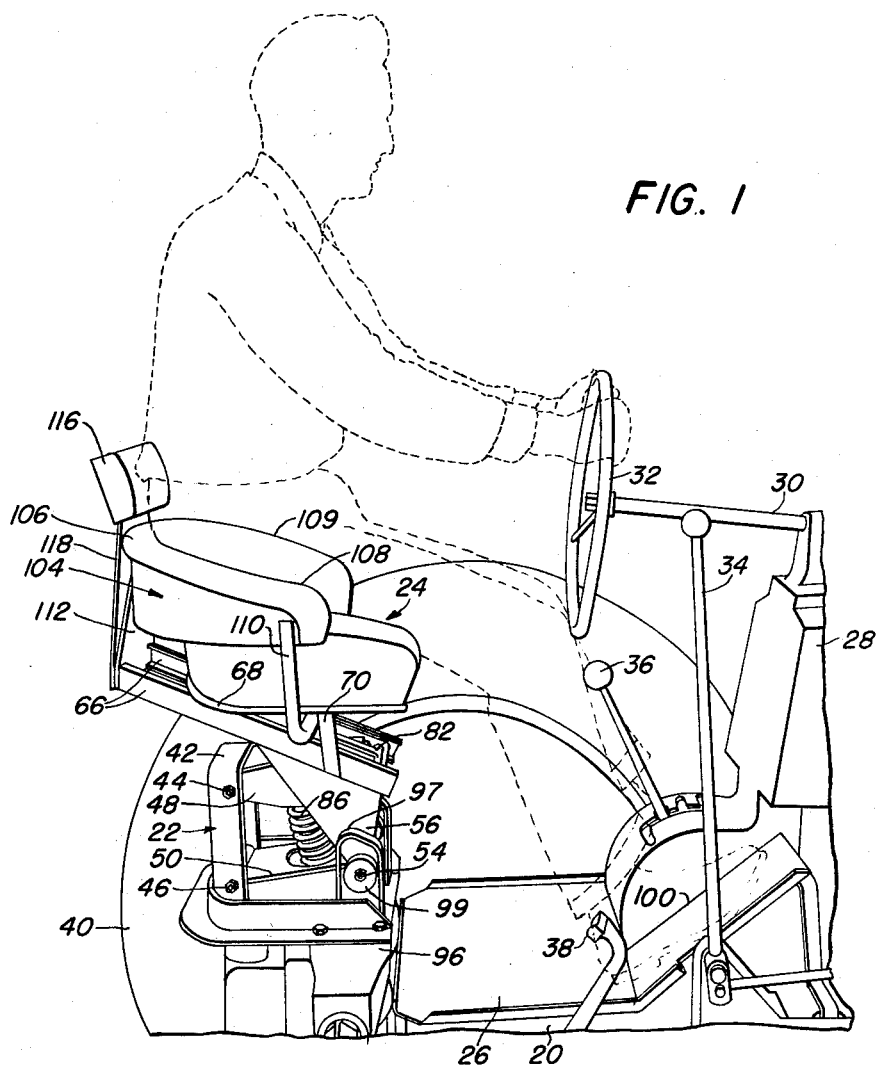
Fig. 1 is a perspective of the improved seat as mounted on a tractor and illustrating in dotted lines the position of a rider or operator carried by the seat.

The rear portion of a conventional agricultural tractor is illustrated in Fig. 1 as having a rear body portion 20 on which is mounted a seat support element 22. A seat element, designated in its entirety by the numeral 24, is carried by the support element 22. A level floor or platform 26 is carried by the body portion 20 just ahead of the seat 24 and affords a space on which the operator may stand. Visible in part at 28 is a portion of the tractor hood over which a steering wheel shaft 30 projects rearwardly to carry a steering wheel 32. Other control members are conveniently grouped for operation by an operator riding on the seat 24 or standing on the platform 26; these include a clutch control lever 34, a gear shift lever 36 and a brake pedal 38. Also visible in Fig. 1 is the left-hand traction wheel 40. Here, as elsewhere throughout this description, the terms "right" and "left" are used with refeernce to the position of an observer standing behind the tractor and looking forwardly.

Although the particular seat support element or suspension system illustrated forms no part of the present invention, it will be described somewhat in detail for the purposes of orienting the remainder of the seat design. As best shown in Figs. 1 and 4, the support element comprises an upright U-shaped member 42 to which are pivoted at 44 and 46 upper and lower forwardly extending links 48 and 50. The forward ends of these links are pivotally connected at 52 and 54 to triangular structure 56 that includes a pair of fore-and-aft spaced apart transverse shafts 58 and 60. Opposite ends of the shafts 58 and 60 carry rollers or followers 62 and 64 which ride in channels 66 secured to and forming a base frame element for the seat 24. These channels also serve as guide means for enabling fore-and-aft adjustment of the seat 24 relative to the support element or suspension means 22. Part of the base frame for the seat includes a seat pan 68 which is rigidly connected to the channels 66 as by front and rear upright supports 70 and 72. The base frame structure and seat are thus movable as a unit in a rearwardly and upwardly or downwardly and forwardly direction because of the relationship between the rollers 62, 64 and the channels 66, the rollers being carried, as stated above, by the cross shafts 58 and 60 which are in turn carried by the triangular structure 56 of the suspension means 22. Any selected position of adjustment of the seat may be secured by latch means comprising a strap 74 pivoted at 76 to the transverse upright support 70 and having a rear portion provided with a handle 78 and a locking pin portion 80. A fixed strap 82 extends fore and aft between the roller shafts 58 and 60 and has therein a plurality of fore-and-aft spaced apart apertures, one of which is visible at 84 in Fig. 5. Thus, the apertured strap 82 is carried by the suspension 22 and the latch strap 74 is carried by the seat 24. Consequently, when the handle 78 is lifted to retract the pin 80 from one of the apertures 84, free fore-and-aft adjustment along the inclined path mentioned may be obtained, after which the latch may be released and the pin 80 will drop into another aperture 84.

Vertical flexibility of the suspension is controlled by yielding means in the form of a coiled compression spring 86 within which is contained a shock-absorbing unit 88, preferably of the hydraulic type. The unit 86—88 is connected at opposite ends respectively at 90 and 92 to the upper links 48 and to a bracket 94 mounted on a rear housing part 96 of the tractor body 20. Fore-and-aft adjustability of the connection 90 is afforded by adjusting means, designated generally by the numeral 98, the details of which are unimportant here. Suffice it to say that the adjustment varies the preload or height on the spring 86 as well as the distance between the points 44 and 90, to accommodate the suspension to riders of different weights. Figs. 1 and 4 show an upstanding loop 97 which functions as a stop that is engageable with a rubber cushion 99 carried at each end of the lower pivot shaft 54 of the suspension linkage. The stop thus provided limits upward travel of the seat.

From the description thus far, it will be seen that the seat 24 is carried by the suspension means 22 for substantially vertical movement, which movement is controlled in part by the parallel links 48 and 50 and in part by the spring and shock-absorber unit 86—88. Adjustment of the seat along the line of the channels 66 is accomplished by the use of the latch means 78, and thus the fore-and-aft position of the seat relative to the steering wheel 32 and other controls 34, 36 and 38 may be varied. Additionally, the height of the seat above the level of the floor 26 will be varied as the seat is adjusted fore and aft. This is an important convenience to riders of varying heights, because the shorter rider is more comfortable when he is closer to the steering wheel and, since the seat moves also downwardly when it moves forwardly, his legs are more readily accommodated to the pedal 38 and other foot-operated controls. As a further adjunct to the arrangement and adjustability of the seat, the platform 26 has a foot rest portion 100 which rises from the front edge of the floor 26 at an angle on the order of 20 to 30 degrees to the horizontal. An angle in this range has been calculated to be best suited to the normal or relaxed position of an operator's leg, having due regard to the tensioning of muscles in the leg and in the foot and further having regard to the angle assumed between the thigh and the lower leg. In association with this feature is the adjustability of the seat along the inclined path mentioned, which path is at an angle on the order of 20 to 30 degrees to the horizontal. The range of rearward movement of the seat is quite large so that if the operator desires to operate the tractor while standing on the platform 26, he may move the seat to its maximum rear position. The padded surface extends forwardly of the front edge of the seat pan to preclude injury to the back of the legs. In this respect, it should be noted that there are many phases of operation of a tractor in which the operator may desire to stand, not only as a change from a seated position but also to enable him to rise above the dust level or to observe some characteristic peculiar to the specific operation.

The seat 24 includes, in addition to the seat pan 68, a seat cushion 102 of yieldable material such as any conventional type of so-called foam rubber, which material is appropriately covered by a fabric or plastic coating not separately designated by a numeral, since details such as that are unimportant. The seat additionally includes a U-shaped element, designated generally by the numeral 104, which embraces the seat from the rear, having a transverse rear or back portion 106 and right- and left-hand side portions 108 and 109. The interior surface of the element 104 rises above the general plane or surface of the seat cushion 102 and is clear of the seat cushion for ventilation and so that the cushion may have vertical flexibility without interference from the element 104. The element is upholstered in any suitable manner, preferably by the same material used in the seat cushion 102. The element is rigidly mounted on the base frame 66 by means of a front support 110 and by means of a rear support 112 (Figs. 1 and 4). This rear support comprises an upright member rigidly secured at its lower end to the rear ends of the channels 66 and rigidly secured at its upper end at 114 to a rear outer portion of the back part 106 of the U-shaped element 104.

When an operator or rider is seated on the cushion 102, his pelvic area is confined at least at the rear and at opposite sides by the U-shaped element 104. Apart from the resilience imparted to the element 104 by the upholstery material, the element is rigid. Thus, the confinement of the operator is one assuring not only adequate comfort but safety. The back portion 106 affords rear support to the rear pelvic area of the rider and the side parts 108 and 109 provide safety from sliding or being thrown sidewise from the seat. The side parts 108 and 109 slope downwardly and forwardly to provide arm rests and these arm rests terminate short of the front end of the seat cushion 102, thus enabling the operator to have relatively free lateral movement of his legs ahead of the arm rests, which aids not only in his mounting on and dismounting from the tractor but permits a certain amount of relaxation incident to changing of positions during riding. The support 110 is so shaped as to afford a convenient hand grip as an aid to the rider in getting on and off the tractor. The embracing relationship of the U-shaped element 104 to the pelvic and hip area of the rider can be best perceived in Fig. 1, wherein it will be noted that the waist area of the rider is above the upper edge of the element.

A further characteristic of the seat 24 is the use of a yieldable back rest 116 which rises above the back part 106 of the element 104. The back rest is carried on resilient means in the form of an upright member 118 secured at its upper end to the back rest as by bolts 120 and rubber mountings 121 and secured to the rear ends of the channels 66 by cap screws 122 which function also to mount the upright 112 on the channels 66. The upright or resilient member 118 is of material having an inherent amount of flexibility so that the back rest is yieldable in a rearward direction from a normal position substantially in vertical alinement with the rear part 106 of the U-shaped element 104. However, uncontrolled yieldability of the back rest 116 is undesirable. For this reason, stop means is provided between the uprights 112 and 118. The specific type of stop means illustrated here comprises a rearwardly projecting tongue 124 on the upper end of the element support 112, which tongue passes through an aperture 126 in the resilient support 118, the tongue having a hooked rear end 128 to afford a stop engageable with a longitudinal portion of the resilient member 118 about the aperture 126. The arrangement is such that although the pelvic area of the rider is confined by the U-shaped element 104, the upper portion of the rider may yield rearwardly if desired to contact the back rest 116 which is automatically alined to the lumbar region by means of the mountings 121 and resilient uprights 118. The stop means 124—126—128 constitutes a safety feature that prevents the operator from tumbling rearwardly off the seat 24.

Reference will now be had particularly to Figs. 6-12 in the description of the seat pan 68.

Figure 8:
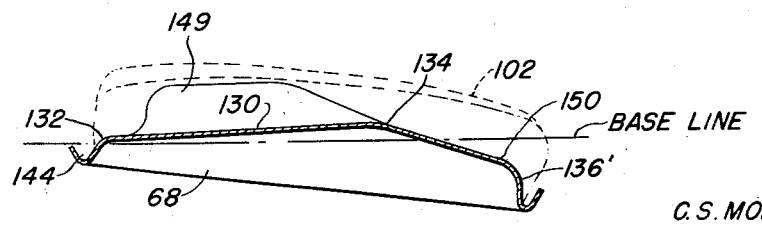
Fig. 8 is a section on the fore-and-aft central or median plane of the seat as seen along the line 8—8 of Fig. 7.

This seat pan is of peculiar and novel construction. It has a rear, central rider-supporting portion 130 that extends forwardly from the rear edge 132 of the seat pan to a transverse zone or bend line 134 that is short or spaced rearwardly of the front edge 136' of the seat pan. The rear central portion 130 is delineated at opposite sides respectively by right- and left-hand fore-and-aft extending zones or bend lines 136 and 137. The general over-all appearance of the seat pan as viewed in plan is somewhat rectangular; although, the rear edge 132 is arcuate. However, the designation "rectangular" will serve the interests of convenience. The seat pan has right- and left-hand rear rounded corners 138 and 139 merging with right- and left-hand sides 140 and 141 respectively. These side edges in turn merge with right- and left-hand front corners 142 and 143 which in turn merge with the front edge 136. The generally rectangular area of the rear, central rider-supporting portion 130, as delineated by the zones 134, 136, 137 and the included portion of the rear edge 132, is considerably smaller than the over-all area of the top surface of the pan. This area or portion 130 is substantially level as respects its transverse appearance but slopes downwardly and rearwardly from the zone 134 to the rear edge 132, as shown in Fig. 8. The angle of the slope is on the order of from 1 to 3 degrees to the horizontal and is preferably 2 degrees. In the interests of clarity and convenience, a horizontal base line bearing the legend "Base Line" is used in Figs. 6 and 8 through 12.

In further explanation of Figs. 6 and 8 through 12, only Figs. 6 and 8 have been shown as utilizing double lines and cross-hatching to indicate thickness of the metal of the seat pan, and only single heavier weight lines have been used in Figs. 9 through 12. The cross-sectional characteristic of the cushion appears only in Fig. 6 but dotted lines indicate the cushion in Figs. 8 through 12. Further, to clarify the section for Fig. 6, a section line X—X is used on Fig. 7 to correspond generally with the line 6—6 of Fig. 2.

The seat pan is turned downwardly and then upwardly about its periphery to form a peripheral bead 144 for receiving the upholstery welt as at 146 (Fig. 6). The bead is open in Figs. 7 through 12 but it is obvious that the bead can be subsequently shaped as in Fig. 6.

The surface of the seat pan 68 includes, in addition to the rear, central rider-supporting portion 130 a pair of lateral portions 148 and 149, as well as a forward or front portion 150. The right-hand lateral portion 148 is delineated at its inner edge by the zone 136, at its rear by the right-hand rear corner 138 and adjoining portion of the rear edge 132 and at its outer side by the associated side edge 140. The left-hand portion 149 is symmetrically delineated by 137, 132, 139 and 141. The front or forward portion 150 begins at the zone or bend line 134 and slopes downwardly and forwardly to the front edge 136 of the seat pan, being delineated at opposite right- and left-hand forward edges by the seat pan corners 142 and 143 and merging with the lateral portions 148 and 149 respectively in diagonal zones 152 and 153. These zones extend respectively laterally outwardly and forwardly from the junctions of the zones 134, 136 and 137, progressing respectively toward the front corners 142 and 143 and merging smoothly therewith. Adjacent its rear portion, each of the lateral portions 148 and 149 rises or slopes upwardly and outwardly toward its associated side edge of the seat pan, at an angle on the order of 20 to 30 degrees, preferably 25 degrees (Fig. 10). This angle gradually diminishes as the lateral portion merges with its associated diagonal zone 152 or 153 (Fig. 11). The forward and downward slope of the front portion 150 is at an angle to the horizontal on the order of 10 to 30 degrees, being preferably 20 degrees (Fig. 8). The manner in which the lateral portion 149 merges with the front portion 150 is apparent in Fig. 6, it being understood that symmetry is achieved at the right-hand side as respects the portions 148 and 150. Hence, the zones 152 and 153 are relatively smooth curves as distinguished from sharp bend lines. As a matter of fact, all of the curves are smoothly flowing and have none of the characteristics of abruptnes. The substantial rear area of the lateral portion 149 before its angle gradually diminishes is best shown in Fig. 8, again it being understood that the right-hand side is symmetrical.

As will be apparent from the section of the seat cushion 102 in Fig. 6 and the dotted-line indications in Figs. 8 through 12, the seat cushion surface initially generally conforms to the configuration of the pan and it has been deemed unnecessary to apply separate reference characters to the surface portions of the cushion. Although there will be variations in the height of the cushion above the respective surface portions of the pan, the portion of the cushion that carries the greatest load is preferably of uniform density. Edge portions of the cushion may be somewhat thinned out (Fig. 10), particularly at the side edges which will be fairly close to the side portions of the U-shaped element 104. On the other hand, the forward portion of the cushion may be of increased height over the front portion 150, which provides adequate support for the rider's thighs but at the same time eliminates troublesome pressure points.

In the use of the seat on a tractor operated under conditions in which there is little if any departure from a level condition as respects lateral departure from a normal central position, the rider will be supported entirely on the central portion 130, with some lateral support to the buttocks being afforded by the upward and outward slopes 148 and 149. Because of the slight rearward inclination of the portion 130, the rider will be comfortably cradled against the rear portion of the U-shaped element 104. Having selected the proper position of adjustment of the seat relative to the steering wheel and other controls, the operator will find that he is comfortably seated, and in a relaxed position his foot may comfortably occupy the foot rest 100. His other foot may be similarly associated with another foot rest (not shown) at the left-hand side of the platform 26. When the tractor encounters a slope transverse to the line of travel, the tractor and accordingly the seat will tilt in that direction. The operator's weight will then shift from entire support on the portion 130 to partial support by the portion 130 and partial support by the associated lateral portion 148 or 149. As previously stated, the most frequently encountered slope in a lateral direction is that experienced in plowing and the slopes of 148 and 149 are calculated to accommodate the usual angle of between 6 to 8 degrees. Although such slope to the left will not normally be encountered in plowing, sidehill operation and sidewise pitching of the tractor during level operation require symmetry of the seat design at both sides of the central or median plane. Since the portions 148 and 149 slope forwardly (Fig. 8), they merge with the front portion 50 and again contribute to the relief of undesirable pressure under portions of the rider's legs. When the tractor and consequently the seat are operating on a transverse slope, the rider, in addition to being appropriately supported by the cooperation between the portions 130 and 148, will be confined against lateral slipping by the presence of the side part or arm rest 108 of the U-shaped element 104. The same will obtain when the tractor is tilted to the opposite side. The use of the resilient back rest 116 for relaxation has already been covered.

As perhaps requiring clarification is the presence of a plurality of apertures 154 in the seat pan 68 (Fig. 7), some of which are for ventilation or breathing of the padding and others of which receive bolts (not shown) for securing the seat pan to the channels 66.

The avoidance of extremely technical anatomical language has been observed, in the interests of clarity and convenience. However, the characteristics of the seat relative to the anatomy of the rider will be readily appreciated by persons schooled in this subject.

Various features of the invention not specifically enumerated will readily occur to those versed in the art, as will minor departures from the specific structure illustrated, all of which may be achieved without departing from the spirit and scope of the invention.

What is claimed is:

1. A vehicle seat of the character described, comprising: a base frame having front and rear ends; a seat cushion above the base frame and having front and rear and opposite side edges; mounting means intermediate the frame and cushion and rigidly mounting the cushion on the frame; a U-shaped rider-supporting element embracing the cushion from the rear and clear of the cushion to permit vertical yielding of the cushion relative to said element, said element having a transverse rear portion extending across and rising above the cushion to afford rear support for the rear pelvic area of the rider and said element having opposite side portions extending along and rising respectively above the side edges of the cushion to afford opposite lateral support for the opposite hip areas of the rider; means rigidly connecting the U-shaped element to the base frame; a transverse central back rest positioned above the transverse rear portion of the U-shaped element to afford a support for the middle back area of the rider; resilient means connecting the back rest to the base frame for rearward yielding relative to the U-shaped element; and limit means cooperative between the back rest and the base frame for limiting rearward yielding of said back rest.

2. The invention defined in claim 1, in which: the means for rigidly connecting the U-shaped element includes an upright member having a lower end secured to the base frame and an upper end secured to the transverse portion of the U-shaped element; the resilient means includes an upright yieldable member having a lower end secured to the base frame and an upper end secured to the back rest, said members lying closely adjacent each other; and the limit means includes interengageable stops respectively on the members.

3. The invention defined in claim 1, in which: the seat cushion has a seating surface including a substantially level portion centrally between its side edges and opposite side portions sloping upwardly and laterally outwardly in opposite directions from said level portions toward the side portions of the U-shaped element.

4. A seat having an upper surface of generally rectangular shape having front and rear and opposite side edges and front and rear corners; said surface including a rear-central rider-supporting portion extending forwardly and upwardly at a slight angle to the horizontal from the rear edge to a transverse zone short of the front edge and delineated at opposite sides respectively by fore-and-aft zones spaced laterally inwardly respectively from the side edges and running from said rear edge to said transverse zone to afford said rider-supporting portion a generally rectangular area materially smaller than the overall area of the entire surface; said surface further including a lateral surface portion at each side of said rider-supporting portion, each lateral portion sloping upwardly and laterally from the associated fore-and-aft zone to the associated side edge and extending from the rear edge toward the associated front corner at a gradually diminishing slope to a diagonal zone extending forwardly, downwardly and laterally from the junction of the transverse zone and the associated fore-and-aft zone to the associated front corner; and said surface further including a forward portion sloping downwardly and forwardly from the transverse zone to the front edge and merging laterally respectively with the diagonal zones.

5. A seat having an upper surface of generally rectangular shape having front and rear and opposite side edges and front and rear corners; said surface including a rear-central rider-supporting portion extending forwardly from the rear edge to a transverse zone short of the front edge and delineated at opposite sides respectively by fore-and-aft zones spaced laterally inwardly respectively from the side edges and running from said rear edge to said transverse zone to afford said rider-supporting portion a generally rectangular area materially smaller than the overall area of the entire surface; said surface further including a lateral surface portion at each side of said rider-supporting portion, each lateral portion sloping upwardly and laterally from the associated fore-and-aft zone to the associated side edge and extending from the rear edge toward the associated front corner to a diagonal zone extending from the junction of the transverse zone and the associated fore-and-aft zone to the associated front corner; and said surface further including a forward portion sloping downwardly and forwardly from the transverse zone to the front edge and delineated at opposite sides respectively by the diagonal zones.

6. A vehicle seat of the character described, comprising: a base frame having front and rear ends; a seat cushion above the base frame and having front and rear and opposite side edges, said seat cushion further having a seating surface including a substantially level portion centrally between its side edges and opposite side portions sloping upwardly and laterally outwardly in opposite directions from said level portions toward said side edges; mounting means intermediate the frame and cushion and rigidly mounting the cushion on the frame; a U-shaped rider-supporting element embracing the cushion from the rear end clear of the cushion to permit vertical yielding of the cushion relative to said element, said element having a transverse rear portion extending across and rising above the seating surface of the cushion to afford rear support for the rear pelvic area of the rider and said element having opposite side portions extending along and rising respectively above the side portions of the seating surface to afford opposite lateral support for the opposite hip areas of the rider; and means connecting the U-shaped element to the base frame.

7. The invention defined in claim 6, in which: each side portion of the U-shaped element has a terminal front end rearwardly of the front edge of the cushion; and the substantially level portion of the cushion terminates in a forward transverse zone approximately in transverse alinement with the terminal front ends of the side portions of the U-shaped element, and said seat surface further includes a front portion sloping downwardly and forwardly from said zone to project ahead of said side portions of the U-shaped element.

8. A vehicle seat of the character described, comprising a seat cushion having front and rear and opposite side edges and further having a seating surface including a substantially level portion extending forwardly from its rear edge centrally between its side edges and terminating short of its front edge and said surface further including opposite side portions sloping upwardly and laterally outwardly in opposite directions from said level portions; a U-shaped rider-supporting element embracing the cushion from the rear and clear of the cushion to permit vertical yielding of the cushion relative to said element, said element having a transverse rear portion extending across and rising above the substantially level portion of the seating surface to afford rear support for the rear pelvic area of the rider and said element having opposite side portions extending along and rising respectively above the side portions of the seating surface to afford opposite lateral support for the opposite hip areas of the rider; and means connecting the element to the seat cushion.

9. A vehicle seat of the character described, comprising: a base element having front and rear ends; a seat cushion on and sustained by said base element; a U-shaped rider-supporting element in embracing relation to the rear of the cushion and arranged to permit vertical yielding of said cushion relative to the U-shaped element, said U-shaped element having a transverse rear portion at a level above the cushion to afford rear support for the rear pelvic area of the rider and further having opposite side portions extending respectively along and above the level of the side edges of the cushion to afford lateral support for the opposite hip areas of the rider; means rigidly connecting the U-shaped element to the base element; a back rest positioned above the rear portion of the U-shaped element for supporting the middle back area of the rider; resilient means supporting the back rest on one of the elements for rearward yielding relative to the U-shaped element; and limit means cooperative between the back rest and one of the elements for limiting rearward yielding of the back rest.

10. The invention defined in claim 1, in which: each side portion of the U-shaped element has a terminal front end rearwardly of the front edge of the cushion; and the cushion has an initial seating surface including a substantially level central portion extending from the back edge to a zone approximately in transverse alinement with the terminal front ends of the side portions of the U-shaped element, and said seat surface further includes a front portion sloping downwardly and forwardly from said zone to project ahead of said side portions of the U-shaped element.

References Cited in the file of this patent

UNITED STATES PATENTS

| | | | |
|---|---|---|---|
| D. 34,152 | Kurek | Feb. 26, | 1901 |
| D. 109,422 | Salomon | Apr. 26, | 1938 |
| D. 150,683 | Eames | Aug. 24, | 1948 |
| 1,388,291 | Nicklaus | Aug. 23, | 1921 |
| 1,455,234 | Thompson | May 15, | 1923 |
| 1,812,703 | Knapp | June 30, | 1931 |
| 2,071,988 | Sasse | Feb. 23, | 1937 |
| 2,232,646 | Stone et al. | Feb. 18, | 1941 |
| 2,283,600 | Dodson | May 19, | 1942 |
| 2,286,468 | Cramer et al. | June 16, | 1942 |
| 2,318,751 | Carlson | May 11, | 1943 |
| 2,485,111 | Robins | Oct. 18, | 1949 |
| 2,546,268 | Legris | Mar. 27, | 1951 |
| 2,554,490 | Eames | May 29, | 1951 |
| 2,560,181 | Morvice | July 10, | 1951 |
| 2,570,177 | Wood | Oct. 2, | 1951 |
| 2,587,751 | Murphy | Mar. 4, | 1952 |
| 2,628,657 | Orrick | Feb. 17, | 1953 |
| 2,667,210 | Eames | Jan. 26, | 1954 |